United States Patent [19]
Saito et al.

[11] 3,937,886
[45] Feb. 10, 1976

[54] POWER SUPPLY SWITCHING CIRCUIT FOR COMBINED AUDIO SYSTEM

[75] Inventors: Takahiko Saito, Kamakura; Koichi Iwase, Chofu; Shojiro Shimada, Tokyo, all of Japan

[73] Assignee: Sony Corporation, Tokyo, Japan

[22] Filed: Sept. 13, 1974

[21] Appl. No.: 505,623

[30] Foreign Application Priority Data
Sept. 19, 1973  Japan.......................... 48-109689[U]

[52] U.S. Cl............................................ 179/1 SW
[51] Int. Cl.²......................................... H04B 1/00
[58] Field of Search...... 179/1 SW, 100; 340/147 R, 340/147 LP, 248 R; 307/11, 43, 115, 154

[56] References Cited
OTHER PUBLICATIONS
Admiral Co., Console Model Y17015, Manual in Sams Set 986, (1968).
Gen. Elec. Co., Console Chassis T7C, Manual in Sams Set 987 (1968).
Vissers, W., "H. F. Switching," Radio & TV News, May 1955.

*Primary Examiner*—Kathleen H. Claffy
*Assistant Examiner*—E. S. Kemeny
*Attorney, Agent, or Firm*—Lewis H. Eslinger; Alvin Sinderbrand

[57] ABSTRACT

In a combined audio system including main audio apparatus, auxiliary audio apparatus comprising at least one of a phonograph record player and a magnetic recorder and/or reproducer having automatic shut-off mechanisms, a power supply switching circuit is disclosed comprising a main switch and a plurality of auxiliary switches for applying power to the main audio apparatus and the auxiliary audio apparatus. The auxiliary switches are controlled by the automatic shut-off mechanism to de-energize the auxiliary audio apparatus and, additionally, selectively supply power therethrough to the main audio apparatus whereby the main audio apparatus is de-energized when the auxiliary audio apparatus is de-energized.

10 Claims, 2 Drawing Figures

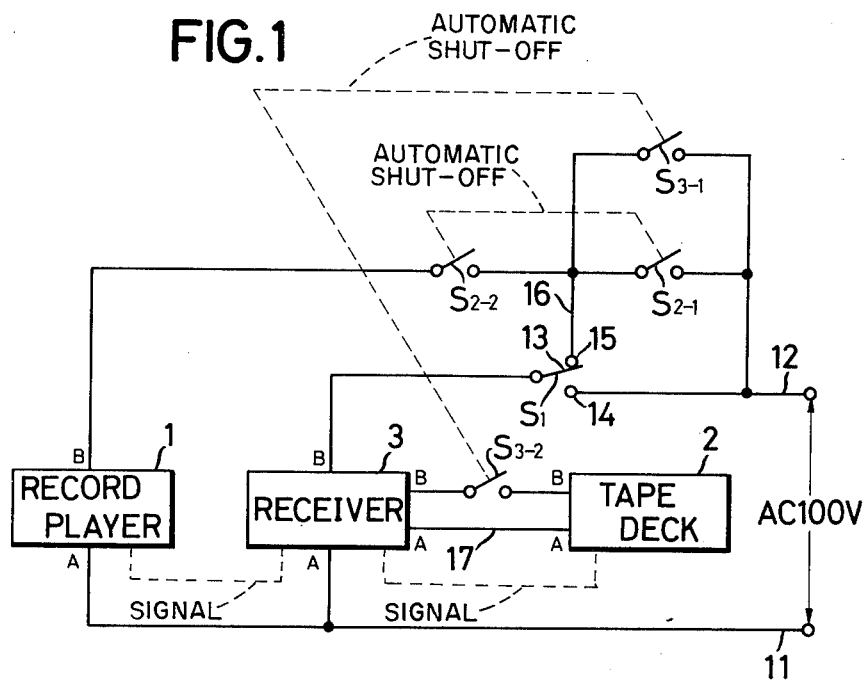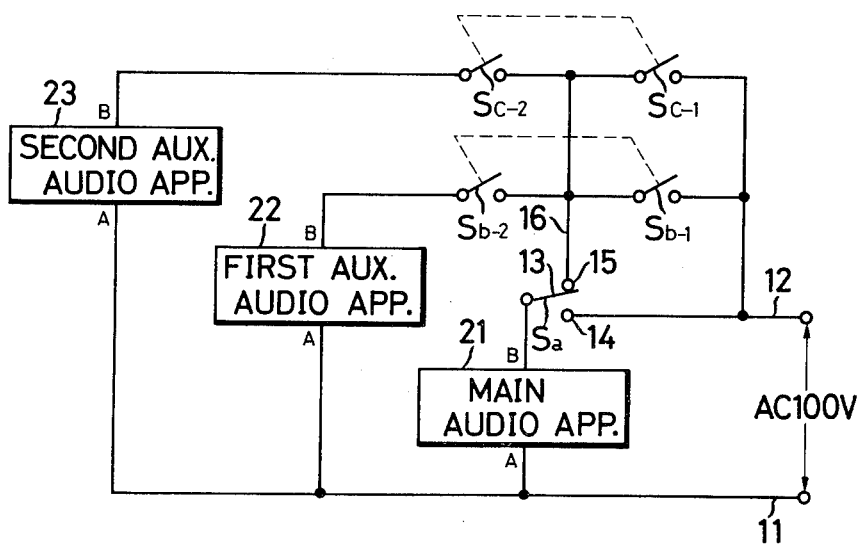

POWER SUPPLY SWITCHING CIRCUIT FOR COMBINED AUDIO SYSTEM

BACKGROUND OF THE INVENTION

1. Field of the Invention

This invention relates to a power supply circuit and, more particularly, to a power supply circuit for use in a combined audio system.

2. Description of the Prior Art

A combined audio system is well known, a typical system comprising a combination stereo signal apparatus for processing and reproducing audio signals. Generally, such combination stereo apparatus includes a main audio apparatus such as a signal receiver including an amplifier and at least one loudspeaker, and auxiliary audio apparatus such as a record player and/or a tape deck. In some combination stereo apparatus, an automatic de-energizing mechanism is arranged by which the record player or the tape deck is de-energized to be non-operative at the end of play of the recorded medium (e.g. record or tape) and then the receiver is de-energized to be non-operative. With this mechanism, even if the user falls asleep during the operation of the system, the record player and the receiver are conveniently de-energized (or shut-off) to be non-operative at the end of play of the recorded medium.

However, when the tape deck including an automatic shut-off mechanism is used in the combination stereo apparatus exhibiting the automatic de-energizing mechanism, the tape deck normally is de-energized at the end of play of the tape, but the receiver is not concurrently de-energized and thus remains operative. Accordingly, the conventional combination stereo apparatus has the disadvantage that the automatic de-energizing operation cannot be performed during the tape reproducing mode.

SUMMARY OF THE INVENTION

Therefore, it is an object of this invention to provide an improved and novel power supply circuit for a combined audio system.

Another object of this invention is to provide a power supply circuit for a combined audio system, the system comprising a main audio apparatus and at least one auxiliary audio apparatus having an automatic shut-off mechanism and in which the main audio apparatus and the auxiliary audio apparatus are de-energized with the actuation of the automatic shut-off mechanism.

A further object of this invention is to provide a power supply circuit for a combined audio system which comprises a main audio apparatus and first and second auxiliary audio apparatus having automatic shuff-off mechanisms, and in which the main audio apparatus remains energized even after one auxiliary audio apparatus is de-energized by its automatic shut-off mechanism, until or unless the other auxiliary audio apparatus is de-energized by its automatic shut-off mechanism.

Various other objects and advantages will become apparent from the ensuing description of preferred embodiments of the present invention, and the novel features will be particularly pointed out in the appended claims.

In accordance with this invention, a power supply circuit is provided for use in a combined audio system, the system including main audio apparatus and auxiliary audio apparatus, and comprising a main switch such as a change-over switch connected to the main audio apparatus; first and second auxiliary switches such as ON-OFF switches connected in series with each other and interlocked for simultaneous operation, the auxiliary switches being connected to the auxiliary audio apparatus for supplying power thereto; and wherein the main audio apparatus is connected directly to a power source in the first change-over position of the main switch and the main audio apparatus is connected to the power source through at least one of the auxiliary switches in the second change-over position of the main switch.

BRIEF DESCRIPTION OF THE DRAWINGS

FIG. 1 is a block diagram of a power supply circuit adapted for use with a combined audio system according to one embodiment of this invention; and FIG. 2 is a block diagram of a power supply circuit adapted for use with a combined audio system according to another embodiment of this invention.

DESCRIPTION OF CERTAIN ONES OF THE PREFERRED EMBODIMENTS

Referring now to the drawings and, in particular, to FIG. 1, a power supply system for a combined audio system according to one embodiment of this invention will be described. The combined audio system is here provided with a record player, a tape deck and a receiver. It should be appreciated that the "combined audio system" as used throughout may include a component stereo system, separate stereo apparatus, an ensemble stereo apparatus, modulus stereo apparatus, and the like, well-known to those of ordinary skill in the audio equipment art.

In the combined audio system shown in FIG. 1, a record player 1, which may comprise a conventional automatic turn table, manual turn table, or the like is provided as a first auxiliary audio apparatus and a tape deck 2, which may comprise a reel-to-reel, cassette or cartridge recorder/reproducer, is provided as a second auxiliary audio apparatus. Both auxiliary apparatus have automatic shut-off mechanisms so as to be de-energized when the record supply or tape supply is exhausted, respectively. Such mechanisms are conventional. A receiver 3 is provided as a main audio apparatus. The receiver 3 typically comprises a tuner, a pre-amplifier, a main amplifier and a loudspeaker to which audio signals are supplied. Terminals A of the record player 1 and the receiver 3 are connected in common to one line 11 of a power source which, for example, may supply AC 100V. Another terminal B of the receiver 3 is connected to a movable contact 13 of a main switch $S_1$. The main switch $S_1$ is provided with a first fixed contact 14 and a second fixed contact 15. The fixed contact 14 is connected directly to another line 12 of the power source and the fixed contact 15 is connected through a conductor 16 to auxiliary switches $S_{2-1}$ and $S_{2-2}$ to be described.

The auxiliary switches $S_{2-1}$ and $S_{2-2}$ are connected in series with each other and serve to connect another terminal B of the record player 1 to the line 12. The switches $S_{2-1}$ and $S_{2-2}$ are interlocked for simultaneous operation and are adapted to be actuated by an automatic return mechanism (not shown) which conventionally functions as the automatic shut-off mechanism of the record player 1, to interrupt the power supplied to the record player 1.

A third auxiliary switch $S_{3-1}$ is connected in parallel with the first auxiliary switch $S_{2-1}$ between the line 12 and the conductor 16. A fourth auxiliary switch $S_{3-2}$, interlocked with the third auxiliary switch $S_{3-1}$ for simultaneous operation therewith, is connected between the power supply terminal B of the tape deck 2 and the auxiliary power supply terminal B of the receiver 3. The auxiliary switches $S_{3-1}$ and $S_{3-2}$ are adapted to be actuated by the automatic shut-off mechanism (not shown) contained in the tape deck 2, to interrupt the power supplied to the tape deck. Terminal A of the tape deck 2 and the auxiliary power supply terminal A of the receiver 3 are connected to each other by a conductor 17. Accordingly, when the switch $S_{3-2}$ is closed and power is supplied to the receiver 3, power is also supplied to the tape deck 2 via the receiver auxiliary power supply terminals, as is conventional.

In FIG. 1, the power supply lines are shown as solid lines and some of the signal lines are represented as broken lines. The signal lines are seen to interconnect the receiver 3, the tape deck 2 and the record player 1.

When the pre-amplifier and main amplifier of the receiver 3 are used in combination with the tape deck 2 to reproduce signals from a recorded tape, the switches $S_{3-1}$ and $S_{3-2}$ which are interlocked with each other, are closed and the movable contact 13 of the main switch $S_1$ is connected to the fixed contact 15. Thus, power is supplied to the receiver 3 from the power source, via line 12, through switch $S_{3-1}$, the fixed contact 15 of the main switch $S_1$ and the movable contact 13 to terminal B. At the same time, power is derived at the receiver auxiliary power supply terminal B and is supplied to the tape deck 2 through the closed switch $S_{3-2}$. A power return path extends from the terminal A of the tape deck via conductor 17 to the auxiliary power supply terminal A of the receiver, and from the receiver to line 11. Accordingly, the output from the tape deck 2 is supplied through the preamplifier and the main amplifier of the receiver 3 to the loudspeaker (not shown) to perform the desirable signal reproduction. If the tape breaks or if the tape supply is exhausted, the automatic shut-off mechanism of the tape deck 2 operates in conventional manner to open switches $S_{3-1}$ and $S_{3-2}$, so that the power supplied to the tape deck 2 is interrupted and further operation thereof terminates. Simultaneously, when the switch $S_{3-1}$ opens, the power supplied to the receiver 3 is interrupted. Consequently, the automatic de-energization of the combined audio system is effected at the end of play of the tape.

Now, when the pre-amplifier and main amplifier of the receiver 3 are used in combination with the record player 1 to reproduce signals from a recorded disc, the switches $S_{2-1}$ and $S_{2-2}$, which are interlocked with each other, are closed and the movable contact 13 of the main switch $S_1$ is connected to the fixed contact 15. Thus, power is supplied to the receiver 3 from the power source, via line 12, through the switch $S_{2-1}$, the conductor 16, the fixed contact 15 of the main switch $S_1$ and the movable contact 13 to the terminal B.

At the same time, power is supplied to terminal B of the record player 1 from line 12 through the closed switches $S_{2-1}$ and $S_{2-2}$. The record player 1 and the receiver 3 are thus energized. Accordingly, the signals reproduced from the recorded disc are supplied through the pre-amplifier and the main amplifier of the receiver 3 to the loudspeaker (not shown) to perform the desirable signal reproduction. When the record playing operation terminates, the automatic shut-off mechanism included in the record player operates in conventional manner to return the pick-up arm automatically to its rest position and to open the auxiliary switches $S_{2-1}$ and $S_{2-2}$, so that the power supplied to the record player 1 is interrupted and further operation thereof ceases. Simultaneously, when the switch $S_{2-1}$ opens, the power supplied to the receiver 3 is interrupted. Consequently, the automatic de-energization of the combined audio system is effected with the end of the record playing.

The foregoing has described the power supply circuit when the receiver 3 is used in combination with either the tape deck 2 or the record player 1. Let it now be assumed that the pre-amplifier and main amplifier of the receiver are used in combination with the record player to reproduce signals from a recorded disc for sound reproduction, and that simultaneously the reproduced signals are supplied to the tape deck to be recorded on tape. The auxiliary switches $S_{2-1}$, $S_{2-2}$, $S_{3-1}$ and $S_{3-2}$ are closed and the movable contact 13 of the main switch $S_1$ is connected to the fixed contact 15. If the tape breaks or if the tape supply is exhausted before the record playing operation terminates, the switches $S_{3-1}$ and $S_{3-2}$ open in response to the tape deck automatic shut-off mechanism, but the switches $S_{2-1}$ and $S_{2-2}$ remain closed. Consequently, power is continued to be supplied to the receiver 3 even after the tape deck is de-energized. Once the record playing operation ceases, the power supplied to the receiver 3 is interrupted. Accordingly, the record playing is not prematurely terminated, but can be performed to its normal conclusion.

It is appreciated that when the switches $S_{2-1}$, $S_{2-2}$, $S_{3-1}$ and $S_{3-2}$ are closed, power is supplied to terminal B of the receiver 3 from the power source via line 12, through a parallel circuit comprising the auxiliary switches $S_{3-1}$ and $S_{2-1}$, the conductor 16, fixed contact 15 of the main switch $S_1$ and the movable contact 13 of the main switch. As aforedescribed, power is derived at the receiver auxiliary power supply terminal B and is supplied to the tape deck 2 through the closed switch $S_{3-2}$. Also, the power supplied through the parallel circuit formed of switches $S_{3-1}$ and $S_{2-1}$ is further transmitted through the auxiliary switch $S_{2-2}$ to terminal B of the record player 1. Thus, the receiver 3, the tape deck 2 and the record player 1 are energized. The signals reproduced in the record player 1 are supplied to the loudspeaker (not shown) through the pre-amplifier and the main amplifier of the receiver 3. Simultaneously, the reproduced signals are recorded on the tape by the tape deck 2. As noted above, if the tape breaks or if the tape supply is exhausted during the record playing operation, the automatic shut-off mechanism included in the tape deck operates to open the auxiliary switches $S_{3-1}$ and $S_{3-2}$, so that the power supplied to the tape deck is interrupted, thereby de-energizing the tape deck. However, power continues to be supplied to the receiver 3 and the record player 1 through the auxiliary switch $S_{2-1}$ which has remained closed, and through switches $S_1$ and $S_{2-2}$, respectively. Accordingly, the record playing is not prematurely terminated. When the record playing ends, the automatic shut-off mechanism included in the record player operates to return the pick-up arm automatically to its rest position and to open the auxiliary switches $S_{2-1}$ and $S_{2-2}$. At this time the parallel circuit formed of switches $S_{3-1}$ and $S_{2-1}$, is opened so that the power supplied to the record player 1 is interrupted and the power supplied to the receiver 3 is simultaneously cut off. Thus, at the normal conclusion of the record playing, the power supplied to all of the apparatus is cut off and the combined audio system is de-energized.

In the above described example, the record player 1 and the tape deck 2 operate independently of each other. However, their operations may be related. For example, the record player and the receiver can be combined electrically or mechanically in such a manner that the automatic shut-off mechanism of the record player 1 will be actuated by that of the tape deck and, conversely, the automatic shut-off mechanism of the tape deck will be actuated by that of the record player. In such an embodiment, one apparatus halts its operation at the end of the operation of the other. Consequently, the power supplied to all of the apparatus is simultaneously cut-off to de-energize the audio system.

When the automatic system de-energization feature is not to be used, the movable contact 13 of the main switch $S_1$ is connected to the fixed contact 14 and the auxiliary switches for the auxiliary apparatus which are used are closed. Power is supplied to the receiver 3 via line 12, through the fixed contact 14 of the main switch $S_1$ and the movable contact 13. Thus, even when the auxiliary switches are opened by the automatic shut-off mechanism of the tape deck 2 or the record player 1, power continues to be supplied to the receiver 3 through the main switch $S_1$.

In the example of the combined audio system shown in FIG. 1, power is supplied to the tape deck 2 from the receiver 3. Hence, the voltage applied to the tape deck 2 need not be equal to the line voltage AC 100V. Accordingly, under certain circumstances, it is possible to operate the apparatus advantageously with a high degree of safety. If the tape deck 2 is energized by direct currents, it is possible to derive a power source therefor directly from the receiver and, therefore, a power circuit for the tape deck is adapted to be of simplified, small-sized and inexpensive construction.

It should be appreciated that the power derived from the receiver auxiliary power supply terminals may be supplied to the record player 1 and not to the tape deck 2. As a further alternative, such derived power may be supplied from the receiver to both the tape deck and the record player.

Referring now to FIG. 2, a power supply circuit for a combined audio system according to another embodiment of this invention will be described. The audio system is here comprised of a main audio apparatus 21 and auxiliary audio apparatus 22 and 23. It may be appreciated that the main audio apparatus and the auxiliary audio apparatus may be comprised of the receiver 3, the record player 1 and the tape deck 2, respectively, of FIG. 1. However, as is apparent in the FIG. 2 embodiment power is supplied directly to the auxiliary audio apparatus 23 from the power source and is not derived from the main audio apparatus. Switches $S_a$, $S_{b-1}$, $S_{b-2}$, $S_{c-1}$, and $S_{c-2}$ in FIG. 2 correspond to switches $S_1$, $S_{2-1}$, $S_{2-2}$, $S_{3-1}$ and $S_{3-2}$ in FIG. 1, respectively.

One terminal A of the auxiliary audio apparatus 23 in connected to a line 11 of the power source and another terminal B of the auxiliary audio apparatus is connected to the fixed contact 15 of the main switch $S_a$ through the auxiliary switch $S_{c-2}$. The remaining components of FIG. 2 are seen to be substantially the same as the corresponding components of FIG. 1 and are electrically connected in a similar manner. Therefore, in the interest of brevity, further description thereof will not be provided. It should be noted that the auxiliary audio apparatus 22 and 23 are provided with automatic shut-off mechanisms, respectively, which may be of the type described above. Thus, at the end of signal reproduction, or at the conclusion of operation, the automatic shut-off mechanism operates to open the auxiliary switches $S_{b-1}$ and $S_{b-2}$ or $S_{c-1}$ and $S_{c-2}$, so that the power supplied to the corresponding auxiliary audio apparatus 22 or 23 is interrupted.

If the main audio apparatus 21 is operated in combination with the auxiliary apparatus 22 or with the auxiliary audio apparatus 23, it will be recognized that such operable combination is substantially similar to the aforedescribed operation of the receiver 3 in combination with the record player 1 of FIG. 1. Therefore, as the manner in which this combination is automatically de-energized is now understood, further description thereof need not be provided.

Now, when the main audio apparatus 21 and the auxiliary audio apparatus 22 and 23 are all operated in the combined audio system, the movable contact 13 is connected to the fixed contact 15 of the main switch $S_a$ and the auxiliary switches $S_{b-1}$, $S_{b-2}$, $S_{c-1}$ and $S_{c-2}$ are closed. Power is supplied to the main audio apparatus 21 from line 12, through a parallel circuit formed of the auxiliary switches $S_{b-1}$ and $S_{c-1}$, the conductor 16, the fixed contact 15 of the main switch $S_a$ and the movable contact 13. Power is also supplied to the auxiliary audio apparatus 22 through the above-mentioned parallel circuit and the auxiliary switch $S_{b-2}$. Further, power is supplied to the auxiliary audio apparatus 23 through the above-mentioned parallel circuit and the auxiliary switch $S_{c-2}$. Accordingly, the main audio apparatus 21 and the auxiliary audio apparatus 22 and 23, respectively, are energized for operation. When the play of the auxiliary audio apparatus 22 ends, for example, the automatic shut-off mechanism therein is actuated to open the auxiliary switches $S_{b-1}$ and $S_{b-2}$ so that the supply of power thereto is interrupted and the operation of the auxiliary audio apparatus 22 ceases. Nevertheless, power remains supplied to the main audio apparatus 21 and to the auxiliary audio apparatus 23 through the closed auxiliary switch $S_{c-1}$. Subsequently, when the play of the auxiliary audio apparatus 23 ends, the automatic shut-off mechanism therein is actuated to open the auxiliary switches $S_{c-1}$ and $S_{c-2}$ so that the supply of power thereto is interrupted and the operation of the auxiliary audio apparatus 23 ceases. Simultaneously, the opening of the switch $S_{c-1}$ interrupts the power supplied to the main audio apparatus 21, thereby automatically de-energizing the audio system.

When the automatic shut-off mechanisms of the auxiliary audio apparatus 22 and 23 operate independently of each other, as above mentioned, the power supplied to the main audio apparatus 21 is not interrupted with the termination of the operation of either the auxiliary audio apparatus 22 or the auxiliary audio apparatus 23. The power supplied to the main audio apparatus 21 is, however, interrupted after the operations of both the auxiliary audio apparatus 22 and the auxiliary audio apparatus 23 end.

Conversely, if the automatic shut-off mechanisms of the auxiliary audio apparatus 22 and 23 are interdependent with respect to each other, the operation of the auxiliary audio apparatus 23 ceases with the termination of the operation of the auxiliary audio apparatus 22. Simultaneously, the operation of the main audio apparatus is terminated. Thus, the power supplied to all of the apparatus is simultaneously cut off to thereby de-energize the audio system.

When the automatic de-energization feature of the combined audio system is not exploited, the movable contact 13 is connected to the fixed contact 14 of the main switch $S_a$ and the auxiliary switches for the auxiliary apparatus to be used is closed. Since power is supplied to the main audio apparatus 21 from the line 12, through the fixed contact 14 and the movable contact 13 of the main switch $S_a$, the power supplied to the main audio apparatus is not interrupted when the auxiliary switch $S_{b-1}$ or $S_{c-1}$ is opened in response to the termination of the operation of the corresponding auxiliary audio apparatus 22 or 23.

Since the power supplied to the main audio apparatus is controlled as above mentioned, the main audio apparatus can be used with each of the auxiliary audio apparatus, for example, the tape deck and the record player in the automatic de-energization mode. Advantageously, the combined audio system can be automatically de-energized so that, in the event the user thereof no longer exercises supervision or control thereof, for example, if the user falls asleep, the system nevertheless automatically turns itself off.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined in the appended claims.

What is claimed is:

1. In a combined audio system including main audio apparatus having an amplifier and auxiliary audio apparatus connected to said main audio apparatus and having automatic shut-off means, a power supply circuit comprising:

main switch means connected between said main audio apparatus and a source of power and being operable to a first position for connecting said source to said main audio apparatus for energizing said main audio apparatus, and to a second position;

auxiliary switch means comprised of at least first and second series-connected interlocked switch means connected between said auxiliary audio apparatus and said source of power to selectively supply power from said source to said auxiliary audio apparatus, said first and second switch means being opened by said automatic shut-off means for de-energizing said auxiliary audio apparatus; and means for connecting said main switch means in series with one of said first and second switch means such that power is selectively supplied to said main audio apparatus through said main switch means and said one switch means when said main switch means is operable to said second position.

2. In a combined audio system including main audio apparatus having an amplifier and first and second auxiliary audio apparatus connected to said main audio apparatus, each of said first and second auxiliary audio apparatus having automatic shut-off means, a power supply circuit comprising:

a main switch connected to said main audio apparatus for supplying power thereto from a source of power;

a first set of series-connected auxiliary switches for supplying power to said first auxiliary audio apparatus from said source of power, said first set of auxiliary switches being controlled by said first auxiliary audio apparatus automatic shut-off means for de-energizing said first auxiliary audio apparatus;

a second set of series-connected auxiliary switches for supplying power to said second auxiliary audio apparatus from said source of power, said second set of auxiliary switches being controlled by said second auxiliary audio apparatus automatic shut-off means for de-energizing said second auxiliary audio apparatus; and connecting means for connecting at least one of the switches included in said first set with at least one of the switches included in the second set in parallel relation and to said main switch to thereby selectively supply power to said main audio apparatus through said main switch and at least one of said parallel connected switches, whereby said main audio apparatus is de-energized when both said first and second auxiliary apparatus are de-energized.

3. A power supply circuit in accordance with claim 2 wherein said first set of auxiliary switches is comprised of first and second switches connected in series; said second set of auxiliary switches in somprised of third and fourth switches connected in series, said first and third switches being connected in parallel by said connecting means; and wherein said main switch comprises a first fixed contact connected to said source of power, a second fixed contact connected to said connecting means and a movable contact connected to said main audio apparatus for selectively contacting one of said fixed contacts.

4. A power supply circuit in accordance with claim 2 wherein said first auxiliary audio apparatus comprises phonograph record playing means and said second auxiliary audio apparatus comprises magnetic tape recording and/or reproducing means.

5. In a combined audio system including main audio apparatus having an amplifier and auxiliary power output terminals, and first and second auxiliary audio apparatus connected to said main audio apparatus, each of said first and second auxiliary audio apparatus having automatic shut-off means, a power supply circuit comprising:

a main switch connected to said main audio apparatus for supplying power thereto from a source of power;

first and second auxiliary switches connected in series between said source of power and said first auxiliary audio apparatus for supplying power to said first auxiliary audio apparatus, said first and second auxiliary switches being controlled by said first auxiliary audio apparatus automatic shut-off means for de-energizing said first auxiliary audio apparatus;

a third auxiliary switch connected in parallel with said first auxiliary switch and being controlled by said second auxiliary audio apparatus automatic shut-off means;

a fourth auxiliary switch interlocked with said third auxiliary switch for simultaneous operation therewith, said fourth auxiliary switch connected between said auxiliary power output terminals of said main audio apparatus and said second auxiliary audio apparatus for supplying power derived at said auxiliary power output terminals to said second auxiliary audio apparatus, said fourth auxiliary switch being operable to de-energize said second auxiliary audio apparatus in response to said second auxiliary audio apparatus automatic shut-off means; and connecting means for connecting said parallel first and third auxiliary switches to said main switch to thereby selectively supply power to said main audio apparatus through said main switch and at least one of said first and third auxiliary switches, whereby said main audio apparatus is de-energized when both said first and second auxiliary apparatus are de-energized.

6. A power supply circuit in accordance with claim 5 wherein said main switch comprises a first fixed contact connected to said source of power, a second fixed contact connected to said connecting means and a movable contact connected to said main audio apparatus for selectively contacting one of said fixed contacts.

7. A power supply circuit in accordance with claim 5 wherein said first auxiliary audio apparatus comprises phonograph record playing means and said second auxiliary audio apparatus comprises magnetic tape recording and/or reproducing means.

8. In a combined audio system including main audio apparatus having an amplifier and first and second auxiliary audio apparatus connected to said main apparatus, each of said first and second auxiliary audio apparatus having automatic shut-off means, a power supply circuit comprising:

main switch means connected to said main audio apparatus and being operable to a first position for connecting a source of power to said main audio apparatus for energizing same, and to a second position;

first auxiliary switch means for supplying power therethrough from said source of power to said first auxiliary audio apparatus for energizing same, said first auxiliary switch means being controlled by said first auxiliary audio apparatus automatic shut-off means for de-energizing said first auxiliary audio apparatus;

second auxiliary switch means for supplying power therethrough to said second auxiliary audio apparatus for energizing same, said second auxiliary switch means being controlled by said second auxiliary audio apparatus automatic shut-off means for de-energizing said second auxiliary audio apparatus; and connecting means for connecting said main switch means in common to said first and second auxiliary switch means such that power is supplied to said main audio apparatus through at least one of said first and second auxiliary switch means when said main switch means is operable to said second position, and whereby said main audio apparatus is de-energized when both said first and second auxiliary apparatus are de-energized.

9. A power supply circuit in accordance with claim 8 wherein said first auxiliary switch means is comprised of first and second switches connected in series; said second auxiliary switch means is comprised of third and fourth switches connected in series, said first and third switches being connected in parallel; and wherein said main switch means comprises a first fixed contact connected to said source of power, a second fixed contact connected to said connecting means and a movable contact connected to said main audio apparatus for selectively contacting one of said fixed contacts.

10. A power supply circuit in accordance with claim 8 wherein said main audio apparatus includes auxiliary power output terminals said first auxiliary switch means is comprised of first and second switches connected in series; said second auxiliary switch means is comprised of a third switch connected in parallel with said first switch and a fourth switch interlocked with said third switch for simultaneous operation therewith, said fourth switch being connected between said auxiliary power output terminals and said second auxiliary audio apparatus; and wherein said main switch means comprises a first fixed contact connected to said source of power, a second fixed contact connected to said connecting means and a movable contact connected to said main audio apparatus for selectively contacting one of said fixed contacts.

* * * * *